United States Patent [19]
Meyers

[11] 3,731,202
[45] May 1, 1973

[54] CRASH PAD CONTAINING A RADIO SHIELDING ELEMENT

[75] Inventor: Dale J. Meyers, Logan, Ohio

[73] Assignee: The Goodyear Tire & Rubber Company, Akron, Ohio

[22] Filed: Mar. 30, 1970

[21] Appl. No.: 23,672

[52] U.S. Cl. ................................................. 325/357
[51] Int. Cl. ............................................. H04b 1/18
[58] Field of Search ..................... 325/312, 313, 357; 343/711, 713, 841; 280/150 B; 174/35 SM, 35 GC, 36, 72 A; 180/90

[56] References Cited

UNITED STATES PATENTS

| | | | |
|---|---|---|---|
| 2,047,151 | 7/1936 | Mitchell | 325/313 |
| 3,436,467 | 4/1969 | Smith, Jr. | 325/357 |
| 3,174,576 | 3/1965 | Woofter et al. | 174/72 A |
| 3,032,604 | 5/1962 | Timmons | 174/36 |
| 3,112,221 | 11/1963 | Price | 174/35.4 |
| 2,904,122 | 9/1959 | Nordrum | 180/90 |
| 3,088,539 | 5/1963 | Mathues | 280/150 B |

*Primary Examiner*—Robert L. Griffin
*Assistant Examiner*—Barry Leibowitz
*Attorney*—F. W. Brunner and J. D. Wolfe

[57] ABSTRACT

A crash pad which includes a decorative skin covering of a foam member and a reinforcing member adapted to permit a radio to be installed in the dash of a vehicle and a flexible radio frequency shielding member having a ground connection.

3 Claims, 1 Drawing Figure

PATENTED MAY 1 1973　　3,731,202
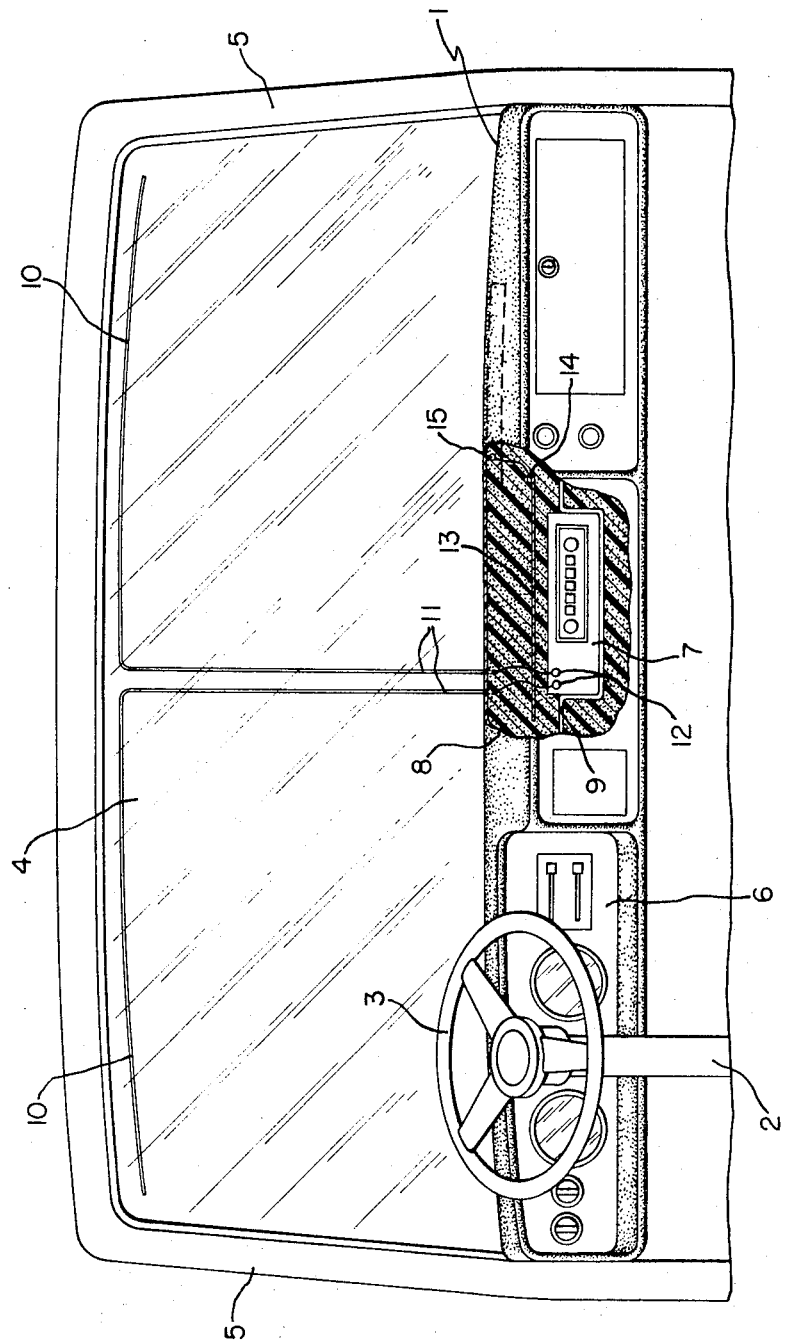
INVENTOR.
DALE J. MEYERS
BY
J.D. Wolfe
ATTORNEY

CRASH PAD CONTAINING A RADIO SHIELDING ELEMENT

This invention relates to a method of making crash pads and to the crash pad per se, wherein the crash pad acts as a shield for the radio.

In recent years the tendency has been for the dash and crash pad section of the automobile to be made of nonmetallic materials to reduce the injuries suffered by the occupants when the automobile is involved in a crash. Also, there has been a recent trend to replacing the upright radio antenna by conductive members painted or embedded in the windshield to reduce vandalism and to improve the aesthetic appearance of the exterior of the automobile. These two trends have given rise to a problem of radio signals being fed back into the antenna, thus distorting the radio reception. When metal plate shielding has been used this has, in effect, reduced the advantages obtained by the use of foamed or padded dashes.

Therefore, an object of this invention is to provide a crash pad having the ability to shield the antenna from feedback from the radio without appreciably increasing its rigidity or reducing its impact-sustaining ability.

This object and other objects and advantages may be readily seen by reference to the drawings wherein a view from the dash and windshield is shown with parts of the dash being cut away to more clearly show the inventive features of this invention.

Referring to the drawing, numeral 1 represents the dash and 2 the steering column, with a steering wheel 3 on the upper end thereof and a windshield 4 positioned above the dash and retained in the desired position by the body upright members 5. It should be noted that the dash is of the padded type and has the usual instruments recessed within the instrument panel 6 and has a radio 7 positioned therein. This radio is of the type customarily used in automobiles and is usually housed within a plastic housing.

Reference to the drawing and the cut-away portions 8 shows that the padded dash is a conventional dash having a flexible skin with foam padding beneath the skin and resting upon a support member 9 usually of plastic or metal. The antenna 10 painted on the windshield has leads 11 extending down to the radio 7 and connected to the posts 12 of said radio. It should be noted that above the radio 7 is a metallic film or other anti-feedback member 13 which has a wire lead extending from the post 14 to the post 15 on the metal body of the automobile to ground the member.

The crash pad of this invention is made in the conventional manner by placing a preformed flexible skin within the mold or forming one within the mold in the conventional manner, placing plastic insert 9 within the cavity of the skin and then adding sufficient foamable mixture to foam and fill the cavity and secure the plastic attaching member 9 to the foam and to the skin. In this embodiment it is preferred that the plastic member 9 is placed within the skin along with the insulating member 13 and is attached or adhered to the skin with a soluble cement. Alternately the insulating member 13 is secured to plastic member 9 prior to the time the foamable mixture is added to the mold cavity.

In this invention we have described the insulating member 13 as being a film of metal such as aluminum or copper foils. It could also be a plastic or organic film having a metallic conductive coating, for instance, a Milar film coated with copper, adhered or deposited therein. Alternately, this could be achieved by painting on a conductive coating to bleed off the electric charges induced by operation of the radio.

A skin suitable for use in this invention can be made in the conventional manner by vacuum forming suitable impressed or embossed sheets of vinyl resin or ABS resin or by casting a suitable vinyl resin such as polyvinyl chloride or the butadiene or other diene polymers, for instance, an ABS resin.

The skins also can be formed by spray or paint coating the mold with a suitable paint or skin forming material such as a liquid polyurethane mixture and allowing it to react and cure to form a film of the desired thickness, usually about 5 to 25 mils thick. Of course, it is to be appreciated that this invention can be utilized with skins formed by any of the other techniques well known to this art.

The suitable foamable mixture for use in this invention is the polyurethane reaction mixture such as those described in U.S. Pat. No. 3,574,888, issued Apr. 13, 1971. Also, other polyurethane foamable reaction mixtures can be used wherein the foaming action is achieved by the use of water to generate carbon dioxide or the use of auxiliary blowing agents such as the fluorinated hydrocarbons or the chlorinated hydrocarbons.

Referring to the drawings, it should be emphasized that the shielding member 13 should extend lengthwise of the crash pad sufficient to be commensurate with the width and length of the radio. In a preferred embodiment the shield should extend at least 3 to 5 inches beyond the overall planned dimensions of the radio.

While certain representative embodiments and details have been shown for the purpose of illustrating the invention, it will be apparent to those skilled in this art that various changes and modifications may be made therein without departing from the spirit or scope of the invention.

What is claimed is:

1. A molded crash pad apparatus including electrical shielding means for a radio receiver, comprising,
   a decorative skin covering;
   a flexible frequency shielding member comprising a conductive material coated on the inside of said decorative skin, said shielding member having a ground connection to allow said shielding member to be grounded;
   a foam member adhered to said skin covering to form said crash pad; and
   a reinforcing member in said crash pad to permit installation of a radio in said crash pad, wherein said radio will be electrically shielded by said flexible frequency shielded member in said crash pad.

2. The crash pad of claim 1 wherein the shielding member is a metallic film.

3. The crash pad of claim 1 wherein the shielding member is an organic film having a conducting metal deposited thereon.

* * * * *